United States Patent
Robinson et al.

(10) Patent No.: US 11,368,446 B2
(45) Date of Patent: Jun. 21, 2022

(54) TRUSTED ACCOUNT REVOCATION IN FEDERATED IDENTITY MANAGEMENT

(71) Applicant: International Business Machines Corporation, Armonk, NY (US)

(72) Inventors: Keiran W. Robinson, Southport (AU); Craig Pearson, Robina Town Centre (AU); Leo M. M. Farrell, Main Beach (AU)

(73) Assignee: International Business Machines Corporation, Armonk, NY (US)

(*) Notice: Subject to any disclaimer, the term of this patent is extended or adjusted under 35 U.S.C. 154(b) by 266 days.

(21) Appl. No.: 16/149,236

(22) Filed: Oct. 2, 2018

(65) Prior Publication Data

US 2020/0106767 A1 Apr. 2, 2020

(51) Int. Cl.
| | |
|---|---|
| *H04L 9/40* | (2022.01) |
| *H04L 9/06* | (2006.01) |
| *H04L 41/5041* | (2022.01) |
| *H04L 67/306* | (2022.01) |
| *G06F 21/41* | (2013.01) |
| *H04L 9/00* | (2022.01) |

(52) U.S. Cl.
CPC ........ *H04L 63/0815* (2013.01); *H04L 9/0637* (2013.01); *H04L 41/5041* (2013.01); *H04L 63/0884* (2013.01); *H04L 63/102* (2013.01); *H04L 63/105* (2013.01); *H04L 67/306* (2013.01); *G06F 21/41* (2013.01); *G06F 2221/2115* (2013.01); *H04L 9/50* (2022.05)

(58) Field of Classification Search
CPC ............ H04L 63/0815; H04L 63/0884; H04L 63/102; H04L 63/105; H04L 9/0637; H04L 2209/38; G06F 21/41
See application file for complete search history.

(56) References Cited

U.S. PATENT DOCUMENTS

| | | | | |
|---|---|---|---|---|
| 6,658,568 | B1 * | 12/2003 | Ginter | G06F 21/10 |
| | | | | 348/E5.006 |
| 9,094,206 | B2 * | 7/2015 | Di Crescenzo | H04L 9/3273 |
| 9,519,902 | B2 * | 12/2016 | Amancherla | G06Q 20/4016 |
| 9,542,683 | B2 * | 1/2017 | Kalinin | G06Q 20/4016 |
| 9,577,999 | B1 * | 2/2017 | Lindemann | H04L 29/06 |
| 9,635,000 | B1 * | 4/2017 | Muftic | H04L 9/30 |
| 9,654,469 | B1 * | 5/2017 | Yang | H04L 63/0861 |
| 9,667,427 | B2 * | 5/2017 | Oberhauser | H04L 9/3236 |
| 9,674,194 | B1 * | 6/2017 | McClintock | H04L 63/10 |
| 9,722,790 | B2 * | 8/2017 | Ebrahimi | H04L 9/3066 |
| 9,749,131 | B2 * | 8/2017 | Baghdasaryan | G06F 21/31 |

(Continued)

OTHER PUBLICATIONS

U.S. Appl. No. 62/660,575, filed Apr. 20, 2018 (Year: 2018).*

(Continued)

*Primary Examiner* — Jeffrey D. Popham

(74) *Attorney, Agent, or Firm* — Stosch Sabo

(57) ABSTRACT

A service provider configured to establish a federated identity management with an identity provider, provision a first user account, and retrieve revocation information from a ledger. The revocation information can include a revoked user account identifier published to the ledger by the identity provider. The service provider can determine that the revoked user account identifier corresponds to the first user account. The service provider can delete the first user account from the service provider.

14 Claims, 6 Drawing Sheets

(56) References Cited

U.S. PATENT DOCUMENTS

| | | | |
|---|---|---|---|
| 9,898,596 B2* | 2/2018 | Lindemann | G07F 19/20 |
| 9,935,772 B1* | 4/2018 | Madisetti | H04L 9/0819 |
| 10,013,423 B2* | 7/2018 | Faith | G06Q 99/00 |
| 10,057,243 B1* | 8/2018 | Kumar | H04W 8/005 |
| 10,091,195 B2* | 10/2018 | Lindemann | H04L 63/0853 |
| 10,102,526 B1* | 10/2018 | Madisetti | H04L 9/3239 |
| 10,148,630 B2* | 12/2018 | Baghdasaryan | H04L 63/0884 |
| 10,194,320 B1* | 1/2019 | Egner | G06Q 20/3223 |
| 10,237,070 B2* | 3/2019 | Lindemann | H04L 9/3231 |
| 10,243,748 B1* | 3/2019 | Callan | H04L 9/3247 |
| 10,270,748 B2* | 4/2019 | Briceno | H04L 63/08 |
| 10,337,240 B2* | 7/2019 | Hall | E06B 9/323 |
| 10,346,845 B2* | 7/2019 | Sherlock | G06Q 20/4016 |
| 10,375,177 B1* | 8/2019 | Bretan | H04L 67/306 |
| 10,425,414 B1* | 9/2019 | Buckingham | H04L 63/083 |
| 10,475,878 B2* | 11/2019 | Bergendahl | H01L 28/60 |
| 10,476,863 B1* | 11/2019 | Hanlon | H04L 63/105 |
| 10,482,468 B2* | 11/2019 | Hosny | G06Q 30/0601 |
| 10,521,791 B2* | 12/2019 | Gerber | G06Q 20/34 |
| 10,547,457 B1* | 1/2020 | Duccini | H04L 63/126 |
| 10,581,847 B1* | 3/2020 | Sun | H04L 63/083 |
| 10,587,413 B1* | 3/2020 | Todd | H04L 9/3247 |
| 10,614,452 B2* | 4/2020 | Tomasofsky | G06Q 20/405 |
| 10,630,673 B1* | 4/2020 | Lingampally | H04L 63/0815 |
| 10,637,665 B1* | 4/2020 | Sundaresan | H04L 9/0891 |
| 10,637,853 B2* | 4/2020 | Lindemann | H04L 63/126 |
| 2002/0026592 A1* | 2/2002 | Gavrila | G06F 21/6218 726/6 |
| 2002/0062451 A1* | 5/2002 | Scheidt | G06Q 20/02 726/7 |
| 2005/0060584 A1* | 3/2005 | Ginter | H04N 21/8355 726/4 |
| 2005/0154913 A1* | 7/2005 | Barriga | H04L 67/1002 726/4 |
| 2005/0272043 A1* | 12/2005 | Roth | G01N 33/57415 435/6.16 |
| 2006/0129817 A1* | 6/2006 | Borneman | H04L 63/0815 713/170 |
| 2006/0161435 A1* | 7/2006 | Atef | G07F 7/1008 704/246 |
| 2006/0218630 A1* | 9/2006 | Pearson | G06F 21/41 726/8 |
| 2006/0218651 A1* | 9/2006 | Ginter | H04N 21/2543 726/27 |
| 2006/0251637 A1* | 11/2006 | Ikehara | A23L 33/15 424/94.1 |
| 2008/0021997 A1* | 1/2008 | Hinton | H04L 63/0815 709/225 |
| 2008/0120240 A1* | 5/2008 | Ginter | G06Q 10/087 705/51 |
| 2009/0138953 A1* | 5/2009 | Lyon | G07F 7/1008 726/9 |
| 2009/0327106 A1* | 12/2009 | Bartelt | G06Q 40/12 705/30 |
| 2010/0122316 A1* | 5/2010 | Lyon | G06F 21/32 726/1 |
| 2011/0202986 A1* | 8/2011 | Horn | H04L 63/0815 726/7 |
| 2012/0008786 A1* | 1/2012 | Cronk | H04L 9/30 380/282 |
| 2012/0030336 A1* | 2/2012 | Monjas Llorente | H04L 63/104 709/223 |
| 2012/0266209 A1* | 10/2012 | Gooding | H04L 63/20 726/1 |
| 2013/0218765 A1* | 8/2013 | Hammad | G06Q 20/4016 705/41 |
| 2014/0020051 A1* | 1/2014 | Lu | H04L 63/10 726/1 |
| 2014/0282884 A1* | 9/2014 | Bao | G06F 21/6263 726/4 |
| 2015/0033305 A1* | 1/2015 | Shear | G06F 21/53 726/6 |
| 2015/0200945 A1* | 7/2015 | Edson | G06F 21/6218 726/28 |
| 2015/0234884 A1* | 8/2015 | Henriksen | G06F 16/951 707/623 |
| 2015/0356523 A1* | 12/2015 | Madden | G06Q 20/065 705/76 |
| 2016/0034684 A1* | 2/2016 | Aguilar-Macias | H04L 63/0815 726/6 |
| 2017/0041206 A1* | 2/2017 | Maes | H04L 41/5009 |
| 2017/0046638 A1* | 2/2017 | Chan | G06Q 40/08 |
| 2017/0177855 A1* | 6/2017 | Costa Faidella | H04L 9/3236 |
| 2017/0200122 A1* | 7/2017 | Edson | H04L 63/104 |
| 2017/0250972 A1* | 8/2017 | Ronda | H04L 9/3236 |
| 2017/0286768 A1* | 10/2017 | Livesay | G06K 9/00288 |
| 2017/0289134 A1* | 10/2017 | Bradley | H04L 63/105 |
| 2017/0316390 A1* | 11/2017 | Smith | H04L 9/3242 |
| 2017/0317833 A1* | 11/2017 | Smith | H04L 9/3236 |
| 2017/0331802 A1* | 11/2017 | Keshava | H04L 9/0891 |
| 2017/0331812 A1* | 11/2017 | Lander | H04L 63/083 |
| 2017/0344983 A1* | 11/2017 | Muftic | G06Q 20/407 |
| 2018/0006826 A1* | 1/2018 | Smith | H04L 9/30 |
| 2018/0039494 A1* | 2/2018 | Lander | H04L 63/0815 |
| 2018/0039942 A1* | 2/2018 | Rogers | G06F 16/48 |
| 2018/0048461 A1* | 2/2018 | Jutla | H04L 9/3236 |
| 2018/0063099 A1* | 3/2018 | Versteeg | H04L 9/3247 |
| 2018/0083771 A1* | 3/2018 | Bonnell | H04L 9/0861 |
| 2018/0101844 A1* | 4/2018 | Song | H04L 9/0825 |
| 2018/0109516 A1* | 4/2018 | Song | H04L 9/3263 |
| 2018/0121482 A1* | 5/2018 | Heen | G06F 16/2358 |
| 2018/0152429 A1* | 5/2018 | Segal | H04W 12/08 |
| 2018/0167378 A1* | 6/2018 | Kostyukov | H04L 63/0815 |
| 2018/0181768 A1* | 6/2018 | Leporini | G06F 21/31 |
| 2018/0204191 A1* | 7/2018 | Wilson | H04L 9/30 |
| 2018/0218364 A1* | 8/2018 | Cantrell | G06Q 20/3829 |
| 2018/0218454 A1* | 8/2018 | Simon | H04L 9/3239 |
| 2018/0248701 A1* | 8/2018 | Johnson | H04L 9/3247 |
| 2018/0285412 A1* | 10/2018 | Zhuang | G06F 9/466 |
| 2018/0288022 A1* | 10/2018 | Madisetti | G06F 21/33 |
| 2018/0307859 A1* | 10/2018 | LaFever | G16H 10/60 |
| 2018/0349206 A1* | 12/2018 | Erickson | G06F 40/263 |
| 2018/0349207 A1* | 12/2018 | Erickson | G06F 9/52 |
| 2019/0013948 A1* | 1/2019 | Mercuri | G06F 9/451 |
| 2019/0028277 A1* | 1/2019 | Jayachandran | H04L 9/085 |
| 2019/0035018 A1* | 1/2019 | Nolan | G06Q 20/3825 |
| 2019/0036692 A1* | 1/2019 | Sundaresan | H04L 9/3247 |
| 2019/0036700 A1* | 1/2019 | Sundaresan | H04L 9/3247 |
| 2019/0036712 A1* | 1/2019 | Qiu | H04L 9/006 |
| 2019/0073666 A1* | 3/2019 | Ortiz | G06F 16/27 |
| 2019/0102409 A1* | 4/2019 | Shi | H04L 63/08 |
| 2019/0114334 A1* | 4/2019 | Gunther | G06F 16/2358 |
| 2019/0122149 A1* | 4/2019 | Caldera | G06Q 10/0635 |
| 2019/0132350 A1* | 5/2019 | Smith | G06F 21/60 |
| 2019/0156056 A1* | 5/2019 | Chavez | G06K 7/1413 |
| 2019/0163912 A1* | 5/2019 | Kumar | H04L 9/3297 |
| 2019/0180276 A1* | 6/2019 | Lee | G06Q 20/0655 |
| 2019/0182042 A1* | 6/2019 | Ebrahimi | H04L 9/3236 |
| 2019/0182257 A1* | 6/2019 | Lee | H04L 63/102 |
| 2019/0188699 A1* | 6/2019 | Thibodeau | G06Q 20/3829 |
| 2019/0188700 A1* | 6/2019 | August | H04L 9/0825 |
| 2019/0188701 A1* | 6/2019 | Parsons | H04L 9/0637 |
| 2019/0190701 A1* | 6/2019 | Mitra | G06N 7/005 |
| 2019/0199793 A1* | 6/2019 | Sarin | H04L 67/306 |
| 2019/0207912 A1* | 7/2019 | Nielson | H04L 9/0877 |
| 2019/0215164 A1* | 7/2019 | Hamann | H04L 9/0866 |
| 2019/0215565 A1* | 7/2019 | Webb | H04N 21/2347 |
| 2019/0222567 A1* | 7/2019 | Caldera | H04L 63/0823 |
| 2019/0230092 A1* | 7/2019 | Patel | H04L 9/0637 |
| 2019/0245699 A1* | 8/2019 | Irwan | H04L 9/3239 |
| 2019/0251295 A1* | 8/2019 | Vieyra | H04L 9/30 |
| 2019/0253238 A1* | 8/2019 | Schnabel | H04L 9/3239 |
| 2019/0253431 A1* | 8/2019 | Atanda | H04L 63/105 |
| 2019/0273617 A1* | 9/2019 | Maher | H04L 9/0844 |
| 2019/0279173 A1* | 9/2019 | Marchetto | G06Q 20/00 |
| 2019/0287199 A1* | 9/2019 | Messerges | G06F 16/27 |
| 2019/0303587 A1* | 10/2019 | Hamel | H04L 9/30 |
| 2019/0303590 A1* | 10/2019 | Hamel | H04L 9/0819 |
| 2019/0303600 A1* | 10/2019 | Hamel | H04L 63/0823 |
| 2019/0303942 A1* | 10/2019 | Balaraman | G06Q 20/4016 |

(56) References Cited

U.S. PATENT DOCUMENTS

| | | | |
|---|---|---|---|
| 2019/0305949 A1* | 10/2019 | Hamel | H04L 9/3226 |
| 2019/0305952 A1* | 10/2019 | Hamel | H04L 9/3271 |
| 2019/0305954 A1* | 10/2019 | Hamel | H04L 9/0897 |
| 2019/0305964 A1* | 10/2019 | Hamel | H04L 9/3218 |
| 2019/0305965 A1* | 10/2019 | Hamel | H04L 9/3231 |
| 2019/0305967 A1* | 10/2019 | Hamel | G07C 9/00857 |
| 2019/0306151 A1* | 10/2019 | Hamel | H04L 9/3263 |
| 2019/0319939 A1* | 10/2019 | Hamel | H04L 9/3226 |
| 2019/0319940 A1* | 10/2019 | Hamel | H04L 9/3271 |
| 2019/0327082 A1* | 10/2019 | Ow | G06Q 20/3674 |
| 2019/0332807 A1* | 10/2019 | LaFever | G06F 21/6254 |
| 2019/0333054 A1* | 10/2019 | Cona | G06F 21/31 |
| 2019/0334886 A1* | 10/2019 | Lelcuk | G06Q 20/0658 |
| 2019/0334904 A1* | 10/2019 | Lelcuk | H04L 63/20 |
| 2019/0347444 A1* | 11/2019 | Lowagie | H04L 9/3073 |
| 2019/0349261 A1* | 11/2019 | Smith | H04L 67/1046 |
| 2019/0349371 A1* | 11/2019 | Smith | G06F 21/31 |
| 2019/0354610 A1* | 11/2019 | Schnabel | H04L 9/3263 |
| 2019/0356491 A1* | 11/2019 | Herder, III | H04L 9/0637 |
| 2019/0370866 A1* | 12/2019 | Lawbaugh | H04L 9/0637 |
| 2019/0379642 A1* | 12/2019 | Simons | G06N 20/00 |
| 2019/0386969 A1* | 12/2019 | Verzun | H04L 63/102 |
| 2020/0005284 A1* | 1/2020 | Vijayan | H04L 9/3239 |
| 2020/0005290 A1* | 1/2020 | Madisetti | H04L 9/3268 |
| 2020/0034553 A1* | 1/2020 | Kenyon | G06F 21/6218 |
| 2020/0050686 A1* | 2/2020 | Kamalapuram | G06F 16/122 |
| 2020/0067907 A1* | 2/2020 | Avetisov | G06F 16/9014 |
| 2020/0076601 A1* | 3/2020 | Tabrizi | H04L 9/3247 |
| 2020/0082117 A1* | 3/2020 | Simmons | G09C 1/00 |
| 2020/0082433 A1* | 3/2020 | Brown | G06F 16/27 |
| 2020/0084483 A1* | 3/2020 | Brown | H04N 21/458 |
| 2020/0106767 A1* | 4/2020 | Robinson | H04L 63/0815 |
| 2020/0112833 A1* | 4/2020 | Cheong | H04W 4/029 |
| 2020/0137567 A1* | 4/2020 | Karapantelakis | H04W 12/0017 |
| 2020/0278963 A1* | 9/2020 | Destefanis | G06F 21/64 |

OTHER PUBLICATIONS

U.S. Appl. No. 62/678,224, filed May 30, 2018 (Year: 2018).*
Bhagavatha et al; U.S. Appl. No. 62/655,175, filed Apr. 8, 2018; hereinafter Bhagavatha (Year: 2018).*

* cited by examiner

TRUSTED ACCOUNT REVOCATION IN FEDERATED IDENTITY MANAGEMENT

BACKGROUND

The present disclosure relates to federated identity management (FIdM), and, more specifically, to revoking user accounts in FIdM.

FIdM can include an identity provider (IdP) and one or more service providers (SP). IdPs can provide access to original user profiles so that SPs can establish derived user profiles. IdPs can provide numerous identity management services, functionalities, and capabilities to one or more SPs such as, but not limited to, user authentication as a service (e.g., single sign-on (SSO)).

SUMMARY

Aspects of the present disclosure are directed toward a computer-implemented method comprising provisioning, by a service provider, a first user account using information provided by an identity provider, where the identity provider provides federated identity management to the service provider. The method can further comprise retrieving, by the service provider, revocation information from a blockchain, where the revocation information includes a first revoked account identifier published to the blockchain by the identity provider. The method can further comprise determining, by the service provider, that the first revoked account identifier corresponds to the first user account. The method can further comprise deleting, by the service provider and in response to determining that the first revoked account identifier corresponds to the first user account, the first user account from the service provider, and publishing, by the service provider and to the blockchain, a first acknowledgement indicating that the service provider deleted the first user account.

Further aspects of the present disclosure are directed toward a computer-implemented method comprises creating, by an identity provider, a blockchain for publishing account revocation information to service providers using the identity provider for federated identity management. The method can further comprise detecting, by the identity provider, a first revoked user account, where the first revoked user account includes a first account identifier. The method can further comprise publishing, by the identity provider and in response to detecting the first revoked user account, the first account identifier to the blockchain. The method can further comprise retrieving, by the identity provider and in response to publishing the first account identifier to the blockchain, an acknowledgement from the blockchain, where the acknowledgement is created by a service provider using the identity provider for federated identity management. The method can further comprise deleting, by the identity provider and in response to retrieving the acknowledgement from the blockchain, the first revoked user account from the identity provider.

Further aspects of the present disclosure are directed toward a computer-implemented method comprising establishing a federated identity management between a service provider and an identity provider. The method can further comprise provisioning, by the service provider and in response to establishing the federated identity management with the identity provider, a first user account using information provided by the identity provider. The method can further comprise creating, by the identity provider, a blockchain for publishing account revocation information. The method can further comprise detecting, by the identity provider, a first revoked user account, where the first revoked user account is associated with a first account identifier. The method can further comprise publishing, by the identity provider, the first account identifier to the blockchain, and retrieving, by the service provider, the first account identifier from the blockchain. The method can further comprise determining, by the service provider, that the first account identifier corresponds to the first user account. The method can further comprise deleting, by the service provider and in response to determining that the first account identifier corresponds to the first user account, the first user account from the service provider. The method can further comprise publishing, by the service provider and to the blockchain, a first acknowledgement indicating that the service provider deleted the first user account. The method can further comprise retrieving, by the identity provider, the first acknowledgement from the blockchain. The method can further comprise deleting, by the identity provider and in response to retrieving the first acknowledgement from the blockchain, the first revoked user account from the identity provider.

Further aspects of the present disclosure are directed toward systems and computer program products functioning similarly to the methods discussed above. The present Summary is not intended to illustrate each aspect of, every implementation of, and/or every embodiment of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
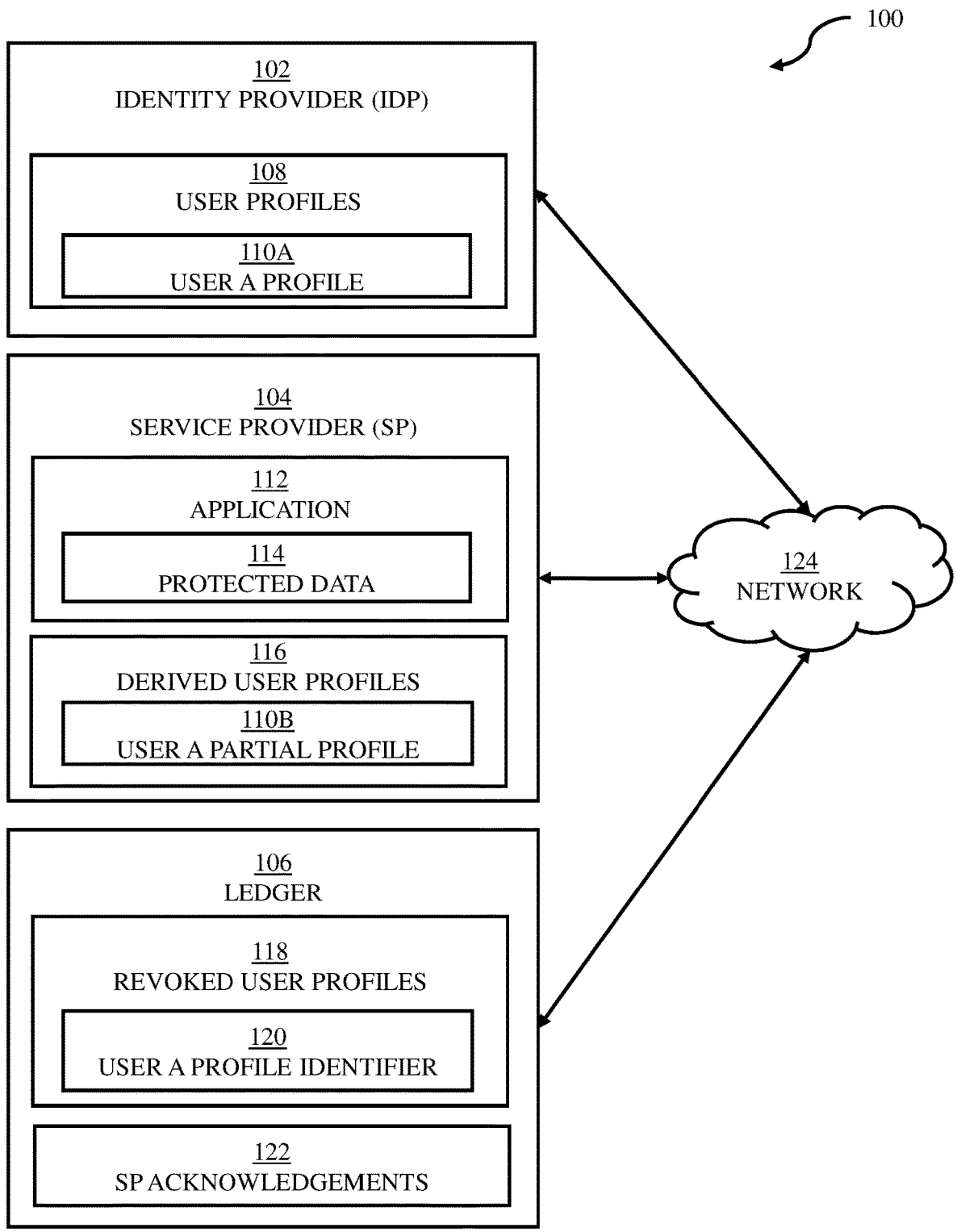
FIG. 1 illustrates a block diagram of an example federated identity management (FIdM) system, according to embodiments of the present disclosure.

While the present disclosure is amenable to various modifications and alternative forms, specifics thereof have been shown by way of example in the drawings and will be described in detail. It should be understood, however, that the intention is not to limit the present disclosure to the particular embodiments described. On the contrary, the intention is to cover all modifications, equivalents, and alternatives falling within the spirit and scope of the present disclosure.

DETAILED DESCRIPTION

Aspects of the present disclosure are directed toward federated identity management (FIdM), and, more specifically, to revoking user accounts in FIdM. While not limited to such applications, embodiments of the present disclosure may be better understood in light of FIdM.

Identity providers (IdPs) can provide FIdM (e.g., single sign-on (SSO)) as a service to one or more service providers (SPs), where each SP interacts with numerous (e.g., hundreds, thousands, millions, etc.) of users by providing software as a service (SaaS) to user devices (e.g., laptops, tablets, smartphones, desktops, etc.). IdPs can create, maintain, and manage original (e.g., authoritative) identity information for users. Identity information can include, but is not limited to, usernames, passwords, security questions, answers to security questions, recovery codes, personal identification numbers (PINs), social security numbers, birth dates, ages, locations, and so on. IdPs can provide this original identity information to SPs to enable SPs to develop derived profiles for the various users (e.g., profiles based on a subset of the user information stored in the IdP). In some cases, the derived profiles stored by the SPs can be used to redirect users attempting to access protected content of the SP to a login managed by the IdP. Users that are successfully authenticated by the IdP can be re-routed back to the SP with access to the protected content of the SP (e.g., using security tokens with OpenID Connect (OIDC), assertions with Security Assertion Markup Language (SAML), etc.).

As discussed above, SPs can generate derived profiles for users based on the user data stored by the IdP. However, when a user account is revoked (e.g., suspended, deleted, etc.) at the IdP, a derived profile can still exist at the SP. Such derived profiles existing at the SP without a corresponding profile at the IdP can be referred to as orphaned, fractured, fragmented, dislocated, and/or inconsistent user profiles. Orphaned profiles at the SP consume unnecessary resources (e.g., storage, processing power, etc.) for SPs. Furthermore, orphaned profiles may present security risks to SPs. Thus, there is a need to securely communicate and expediently delete profiles at the SP that correspond to revoked user profiles at the IdP in order to improve storage efficiency and/or security.

Aspects of the present disclosure overcome the challenge of consistent IdP/SP account revocations by providing a mechanism for the IdP to publish account revocations to a ledger (e.g., database, vector, blockchain, etc.). The SP can examine the ledger for account revocations corresponding to partial user accounts stored by the SP. The SP can then delete orphaned profiles corresponding to revoked IdP accounts. In some embodiments, the SP can publish an acknowledgement to the ledger indicating to the IdP that the SP has taken corrective action regarding a particular revoked user account. Thus, aspects of the present disclosure provide a mechanism for consistent IdP/SP account revocations that is secure, trusted, and efficient.

Aspects of the present disclosure exhibit numerous advantages. First, aspects of the present disclosure provide a trusted mechanism for publishing account revocations. By publishing account revocation events to a blockchain, aspects of the present disclosure can limit inaccurate account revocation information being distributed by IdP imitators. For example, by publishing account revocation information to a blockchain (rather than communicating directly with SPs), aspects of the present disclosure avoid the possibility of IdP imitators sending malicious communications to SPs.

Second, aspects of the present disclosure provide a secure mechanism to facilitate communication regarding account statuses between an IdP and a SP. For example, the account revocation information can be stored on a blockchain that provides an immutable record of account revocation information. In some embodiments, account identifiers are encrypted or otherwise anonymized to reduce misuse of account information. In some embodiments, the account revocation information is uploaded in randomized orders and/or in batches to further anonymize the account revocation information. Thus, aspects of the present disclosure are both accessible to numerous SPs (e.g., published to a shared blockchain) while also being secure from malicious use (e.g., data is stored on a blockchain, randomized, anonymized, and/or encrypted).

Third, aspects of the present disclosure provide efficient IdP/SP account consistency by limiting processing overhead and/or communication overhead. For example, since the account revocation information is published to a shared ledger, the IdP and the SP can each poll information from, and publish information to, the shared ledger at times convenient to the IdP and SP. For example, the SP may have excess communication and processing bandwidth between 2:00 AM and 3:00 AM, and may poll the shared ledger for updated account revocation information during that time.

The aforementioned advantages are example advantages, and embodiments of the present disclosure exist that can realize all, some, or none of the aforementioned advantages while remaining within the spirit and scope of the present disclosure.

Referring now to FIG. 1, illustrated is a block diagram of an example federated identity management (FIdM) system 100, according to embodiments of the present disclosure. FIdM system 100 can include an identity provider (IdP) 102, a service provider (SP) 104, and a ledger 106 communicatively coupled by a wireless or wired network 124. IdP 102 can include user profiles 108 including user A profile 110A. User profiles 108 can include, for example, usernames, email addresses, passwords, personal identification numbers (PINs), security questions, answers to security questions, phone numbers, names, birth dates, genders, ages, locations, addresses, social security numbers, credit card numbers, account numbers, and/or other information for respective users. IdP 102 can use user profiles 108 to provide SSO services to multiple SPs including, for example, SP 104.

SP 104 can include an application 112 (e.g., SaaS) having protected data 114 and derived user profiles 116 including user A partial profile 110B, where user A partial profile 110B in SP 104 comprises a subset of user A profile 110A in IdP 102. User A partial profile 110B can be used by the SP 104 in order to, for example, associate information (e.g., usage statistics, user preferences, etc.) of application 112 with user A partial profile 110B.

Application 112 can be any SaaS application or network-based application benefiting from credentialed access. For example, application 112 can provide content (e.g., software, interfaces, journal articles, movies, video games, books, etc.), perform financial transactions (e.g., an online banking portal, an online brokerage, etc.), store personal data (e.g., a personal fitness tracker, a budget tracker, etc.), or otherwise collect, store, distribute, process, or otherwise manipulate sensitive data requiring privacy and/or security. Thus, protected data 114 can be, for example, software, content, financial information, personal information, confidential information, and/or other information/functionality.

Ledger 106 can store a list of revoked user profiles 118 and SP acknowledgements 122. Revoked user profiles 118 can be revoked user accounts published by IdP 102 to ledger 106 and identified by an identifier such as user A profile identifier 120. SP 104 can poll ledger 106 to identify revoked user profiles 118 corresponding to users in derived user profiles 116. When finding a match between revoked user profiles 118 and derived user profiles 116, SP 104 can delete the corresponding user account from derived user profiles 116 and provide a SP acknowledgement 122 to ledger 106. SP acknowledgements 122 can include the user A profile identifiers 120, an SP identifier, and/or a timestamp. In some embodiments, IdP 102 monitors ledger 106 for SP acknowledgements 122 and, once any necessary SP acknowledgements 122 have been received, permanently deletes any revoked user accounts.

For example, user A profile 110A can be revoked. Profiles can be revoked for any number of reasons, such as, but not limited to, a user electing to delete a profile, a profile being automatically deleted because of agedness (e.g., unused for an amount of time above a threshold), a profile being deleted due to security concerns (e.g., fraudulent activity, compromised security, etc.), and/or other reasons. In response to user A profile 110A being revoked, IdP 102 can suspend user A profile 110A and publish user A profile identifier 120 in revoked user profiles 118 of ledger 106. User A profile identifier 120 can be a public identifier (e.g., an email address), an anonymous identifier (e.g., an account number), or an encrypted identifier (e.g., a hashed email address, a hashed name, a hashed account number, a hashed social security number, etc.).

SP 104 can poll ledger 106 and determine that user A profile identifier 120 corresponds to user A partial profile 110B stored by SP 104. In response, SP 104 can delete user A partial profile 110B and provide a SP acknowledgement 122 to ledger 106. IdP 102 can poll ledger 106 and identify the SP acknowledgement 122 corresponding to user A profile 110A. In response, IdP 102 can permanently delete user A profile 110A from IdP 102.

Although ledger 106 is shown separately from IdP 102 and SP 104, in some embodiments, a copy of ledger 106 is stored by each of IdP 102 and SP 104 (e.g., where ledger 106 is a blockchain and IdP 102 and SP 104 are distributed nodes supporting the blockchain). In some embodiments, ledger 106 is stored separately from IdP 102 and SP 104 and accessible to each of IdP 102 and SP 104 by network 124. In various embodiments, ledger 106 can be a private blockchain, a hybrid blockchain, a consortium-based blockchain, a public blockchain, a public database, a private (e.g., password-protected) database, an encrypted database, a vector (e.g., where each element of the vector stores a revoked user profile identifier), or a different data structure appropriate for storing a list of revoked user profiles.

In some embodiments where ledger 106 is a blockchain, ledger 106 can store changes to the list of revoked user profiles 118 as transactions. In some embodiments, SP acknowledgements 122 are also stored as transactions in ledger 106. In some embodiments, ledger 106 stores user account status changes as transactions. For example, a user account changing from "active" status to "revoked" status can be considered a transaction. Ledger 106 is discussed in more detail hereinafter with respect to FIGS. 5A and 5B.

Although IdP 102 is shown separately from SP 104, in some embodiments, IdP 102 and SP 104 belong to a same company, corporation, or organization, and can be considered as a single entity having segregated functionalities.

Network 124 can be a wired (e.g., Ethernet, Infiniband, etc.) or wireless (e.g., wireless local area network (WLAN), wireless area network (WAN), a cellular network, etc.) network capable of permanently or intermittently interconnecting IdP 102 with SP 104 with ledger 106. Advantageously, aspects of the present disclosure can be realized with intermittent, rather than permanent, network communication.

Figure 2:
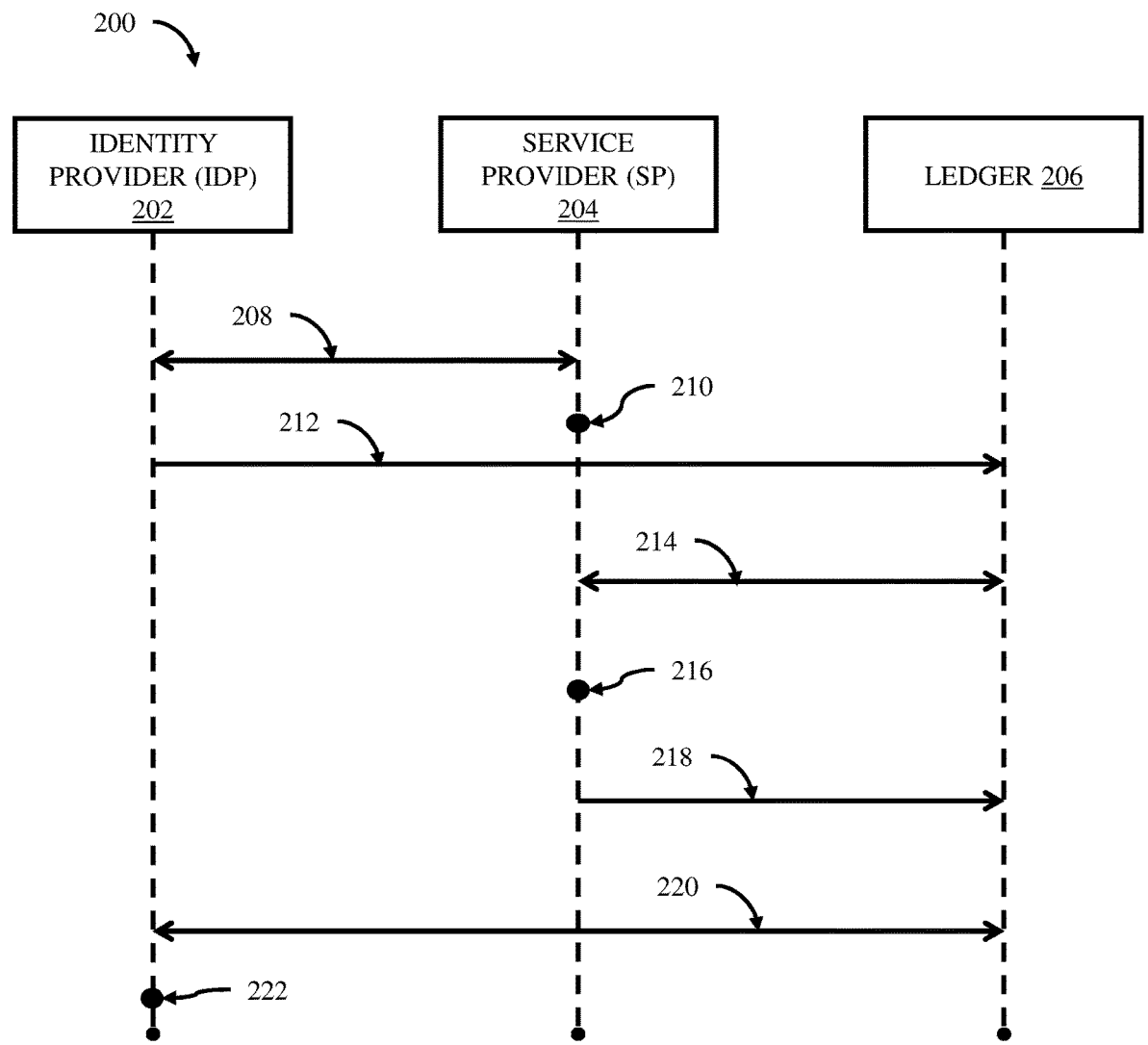
FIG. 2 illustrates a communication diagram, according to embodiments of the present disclosure.

Referring now to FIG. 2, illustrated is a communication diagram 200, in accordance with embodiments of the present disclosure. The vertical direction of FIG. 2 can correspond to time, where higher events correspond to earlier times and lower events correspond to later times. However, the spacing of events in FIG. 2 does not represent exact or relative durations of time. For example, some events may take seconds, minutes, hours, or a different amount of time. Likewise, some intervals between events can be seconds, minutes, hours, days, or a different interval of time. FIG. 2 is provided only as a representative overview of some aspects of the present disclosure.

IdP 202, SP 204, and ledger 206 can be consistent with IdP 102, SP 104, and ledger 106, respectively, in accordance with some embodiments of the present disclosure. IdP 202 can include a user registry storing user account data for various user profiles. IdP 202 and SP 204 can establish a FIdM 208. SP 204 can use just-in-time (JIT) provisioning to provision user accounts 210 in a local store of the SP 204 in response to establishing the FIdM 208. IdP 202 can publish an account revocation event 212 to ledger 206. SP 204 can poll and retrieve 214 account revocation information from ledger 206. SP 204 can remove 216 the JIT provisioned user account associated with the revoked user account of the published account revocation event 212. SP 204 can publish an acknowledgment 218 to ledger 206 indicating that SP 204 successfully removed 216 the user account from its local data store corresponding to the published account revocation event 212 from the IdP 202. IdP 202 can poll and retrieve acknowledgements 220 from ledger 206, including the published acknowledgment 218. In response to polling and retrieving acknowledgements 220, IdP 202 can permanently remove 222 the revoked user account from the IdP 202.

The aforementioned operations and interactions illustrated in the communication diagram 200 can be completed in other orders than the order described. Additionally, some, all, or none of the aforementioned operations and/or interactions can be completed, while still remaining within the spirit and scope of the present disclosure.

Figure 3:
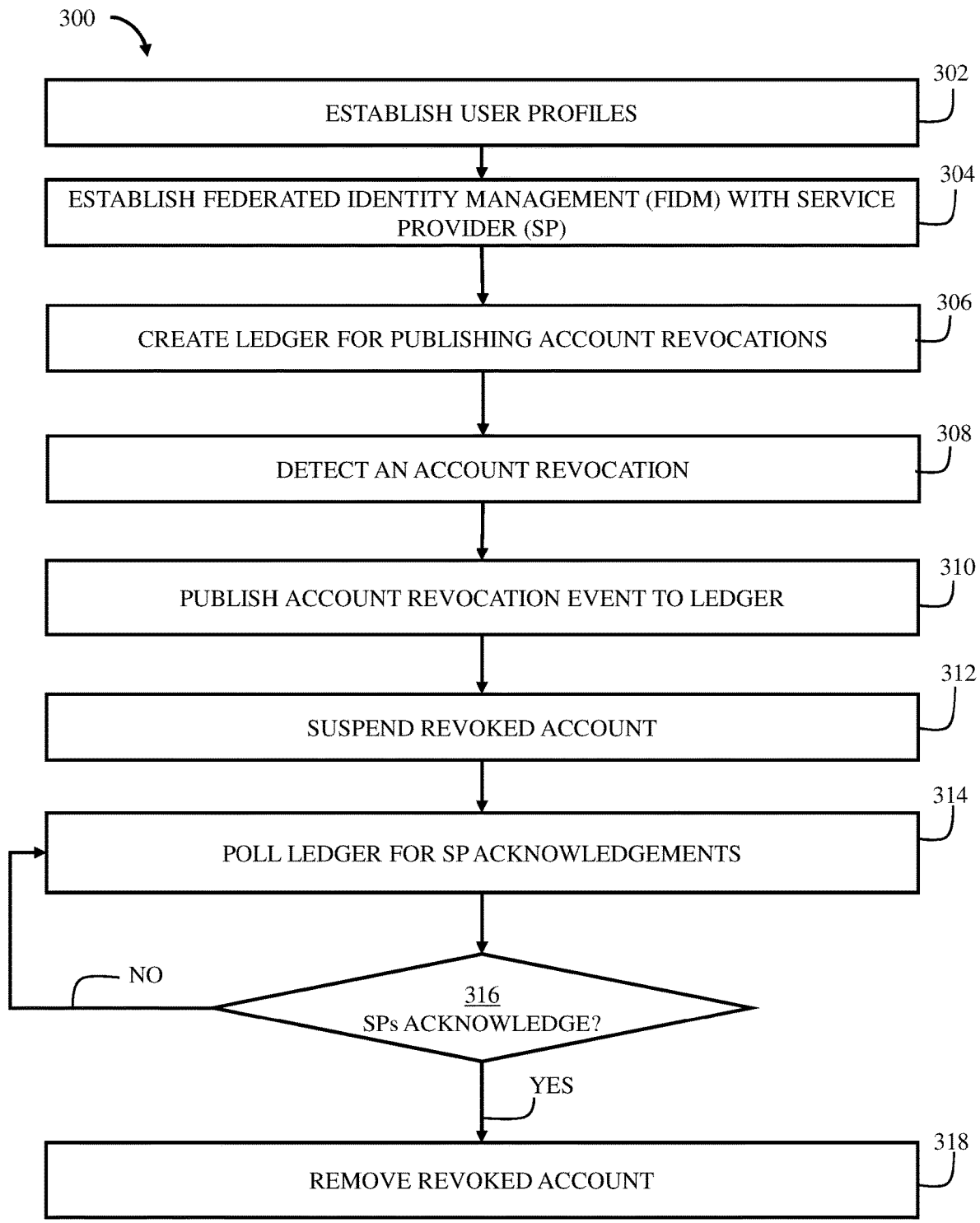
FIG. 3 illustrates a flowchart of an example method for publishing account revocations, according to embodiments of the present disclosure.

Referring now to FIG. 3, illustrated is a flowchart of an example method for publishing revocations, according to embodiments of the present disclosure. In some embodiments, the method 300 is performed by an IdP (e.g., IdP 102 of FIG. 1 or IdP 202 of FIG. 2), by an identity management system (e.g., identity management system 600 of FIG. 6), or by a different combination of hardware and software. For clarity, the method 300 will be described as being performed by an IdP.

In operation 302, the IdP establishes user profiles. The profiles can include information for respective user profiles such as, but not limited to, usernames, email addresses, passwords, names, birth dates, genders, ages, addresses, locations, personal identification numbers (PINs), security questions, answers to security questions, recovery codes, social security numbers, account numbers, and/or other information. In some embodiments, the established use profiles are referred to as a user registry.

In operation 304, the IdP establishes FIdM with a SP (e.g., SP 104 of FIG. 1 or SP 204 of FIG. 2). FIdM can enable identity management functionalities such as, but not limited to, SSO. Establishing FIdM can include SAML-based authentication, Kerberos-based authentication, OIDC-based authentication, OAuth 2.0-based authentication, or a different authentication technique.

In operation 306, the IdP creates a ledger for publishing account revocations (e.g., ledger 106 of FIG. 1 or ledger 206 of FIG. 2). The ledger stores user profile revocation information for profiles established in operation 302. In some embodiments, the ledger can be a private, hybrid, or public blockchain. In embodiments where the ledger is a blockchain, the blockchain can have properties relating to being distributed (e.g., stored by more than one node), immutable (e.g., modifications cannot be deleted or changed), and/or permissioned (e.g., only invited members can access the blockchain). In other embodiments, the ledger is a public database, a password-protected database, an encrypted database, a vector, or a different data structure conducive to storing revoked account identifiers. Some data in the ledger can be encrypted, hashed, batched, randomized, or otherwise anonymized for privacy and/or security.

The ledger can include a list of revoked account identifiers. The list of revoked account identifiers can identify accounts by publicly known identifiers (e.g., an email address that may be known by each SP), anonymous identifiers (e.g., a username or account number that may not be shared among different SPs), and/or encrypted identifiers (e.g., an encrypted email address that can only be decrypted by a designated SP).

In some embodiments, the IdP advertises a "revoked" uniform resource locator (URL) as part of its definition which corresponds to the list of revoked account identifiers. In some embodiments, the "revoked" URL can be a part of SAML metadata, OIDC discovery, or different authentication protocols.

In operation 308, the IdP detects an account revocation. Accounts can be revoked for any number of reasons, such as, but not limited to, a user electing to delete an account, an account being automatically deleted because of agedness (e.g., unused for an amount of time above a threshold), an account being deleted due to security concerns (e.g., fraudulent activity, compromised security, etc.), and/or other reasons.

In operation 310, the IdP publishes an account revocation event to the ledger. The account revocation event can include an identification of the user account (e.g., a username, an account number, etc.) that is publicly known, anonymous, or encrypted. In some embodiments, the account revocation event can include a reason for the account revocation (e.g., user request to delete the account, evidence that the account is insecure, a determination that the account is unused for a time above a threshold, etc.).

In some embodiments, the account revocation event published to the ledger can include an issuer field that can be cryptographically signed by the IdP, thereby authenticating the validity of the revocation event.

In some embodiments, the IdP publishes user account revocations in batches where the individual account revocation information is randomized within the batch. Batching and/or randomization can promote security by scrambling information related to timing and/or sequencing of particular account revocations which may otherwise be explicitly shown in, or indirectly gathered from, the time and order in which particular account revocations are published to the ledger. Furthermore, batching can promote IdP processing efficiency by enabling the IdP to publish account revocation information during times of excess processing capacity and/or communication capacity.

In operation 312, the IdP suspends one or more revoked accounts associated with the published account revocation event from operation 308. Suspending the revoked account can include isolating, inactivating, or otherwise limiting permissions and/or functionality associated with the use of the revoked account. Advantageously, by suspending the revoked account temporarily (rather than permanently deleting it immediately), the IdP can provide one or more SPs time to review and acknowledge the account revocations, thereby avoiding the possibility of permanently deleting account information that may be critical to a SP.

In operation 314, the IdP polls the ledger for SP acknowledgements (e.g., SP acknowledgements 122 of FIG. 1). In some embodiments, the IdP can poll the ledger at each interval of time (e.g., every four hours), or at a recurring time (e.g., each morning at 1:00 AM).

In operation 316, the IdP determines if one or more SPs have published acknowledgements to the ledger corresponding to the account revocation event from operation 308. In some embodiments, an acknowledgement from the SP indicates that the SP has removed local account information in the SP associated with the account revocation event from the IdP. Acknowledgements from the SP can include, for example, a timestamp, an account identifier, and a SP identifier.

If none of, or not all of, the SPs have published an acknowledgement to the ledger (e.g., NO at operation 316), the IdP can return to operation 314 and continue polling the ledger.

If one of, some of, or all of, the SPs have published an acknowledgement to the ledger (e.g., YES at operation 316), the IdP can proceed to operation 318 and remove the revoked account. Removing can refer to deleting, partially deleting, permanently destroying, transmitting to off-site storage, or otherwise removing the revoked account information from the IdP.

The aforementioned operations of the method 300 can be completed in other orders than the order described. Additionally, some, all, or none of the aforementioned operations can be completed, while still remaining within the spirit and scope of the present disclosure.

Figure 4:
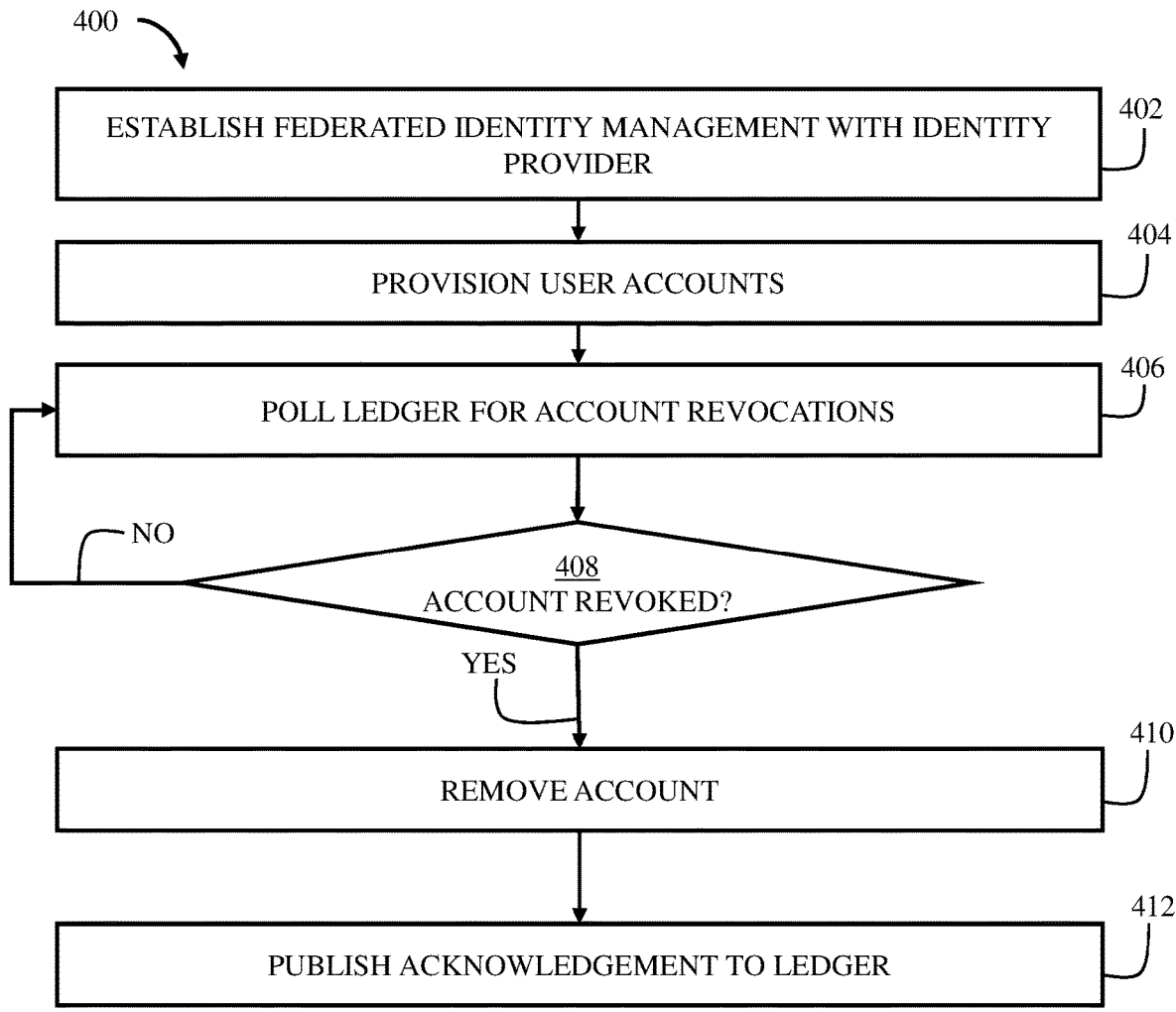
FIG. 4 illustrates a flowchart of an example method for removing revoked accounts based on published account revocations, according to embodiments of the present disclosure.

Referring now to FIG. 4, illustrated is a flowchart of an example method for deleting revoked user accounts at a service provider (SP), in accordance with embodiments of the present disclosure. In some embodiments, the method 400 is performed by a SP (e.g., SP 104 of FIG. 1, SP 204 of FIG. 2), by an identity management system (e.g., identity management system 600 of FIG. 6), or by a different combination of hardware and software. For clarity, the method 400 will be described as being performed by a SP.

In operation 402, the SP establishes FIdM with an IdP (e.g., IdP 102 of FIG. 1, IdP 202 of FIG. 2). The FIdM can use SAML, OIDC, OAuth, or other identity management standards and/or protocols. In some embodiments, the FIdM includes SSO functionality where logging in to access SP functionality is managed by the IdP.

In operation 404, the SP provisions user accounts based on information from the IdP and stores a partial (e.g., derived) user account in a local storage of the SP. The partial user account can include some of, but not necessarily all of, the information for the selected user stored in the IdP. The partial user account can also include additional information not necessarily stored in the IdP (e.g., information based on the user's usage of the SP that may be relevant to the SP, but may not be relevant to the IdP). In some embodiments, operation 404 includes JIT provisioning of user accounts, or different user account creation techniques.

In operation 406, the SP polls a ledger (e.g., ledger 106 of FIG. 1, ledger 206 of FIG. 2) for account revocation information. In some embodiments, the SP can receive access to the ledger as part of establishing the FIdM with the IdP in operation 402. The SP can poll the ledger at recurring intervals (e.g., every twelve hours), at selected times, at times when a processing capacity of the SP falls below a processing threshold, and/or in response to a user attempting to login (e.g., an authentication attempt). For example, if a first user attempts to login to the SP, the SP can poll the ledger to determine if the first user is associated with a revoked account. As another example, the SP may be a website that has limited traffic between 2:00 AM and 4:00 AM. The SP can be configured to poll the ledger for account revocation information between 2:00 AM and 4:00 AM. The account revocations can include a list of revoked account identifiers including account identifiers in public format, anonymous format, and/or encrypted format. In some embodiments, revoked account identifiers are email addresses, usernames, or account numbers.

In operation 408, the SP can determine if a partial user account stored in the SP corresponds to a revoked user account provided by the IdP. In some embodiments, operation 408 includes matching an account identifier (e.g., a username, an account number, etc.) from the account revocations retrieved from operation 406 to a partial user account stored in the SP.

If the SP determines that there are no matches between account revocations published by the IdP to the ledger and partial accounts stored in the SP (e.g., NO at operation 408), then the SP can return to operation 406 and continue polling the ledger for account revocation information.

If the SP determines that there is at least one match between account revocations published by the IdP to the ledger and partial accounts stored in the SP (e.g., YES at operation 408), then the SP can proceed to operation 410 and remove the account from the SP. Removing the account can include, but is not limited to, suspending the account, deactivating the account, partially deleting the account, permanently deleting the account, transmitting the account information to a repository, or a different removal technique.

In operation 412, the SP can publish an acknowledgement to the ledger indicating that the SP is aware that the relevant account is revoked at the IdP, and that the SP has taken any necessary corrective action (e.g., removing the account at operation 410).

The aforementioned operations of the method 400 can be completed in other orders than the order described. Additionally, some, all, or none of the aforementioned operations can be completed, while still remaining within the spirit and scope of the present disclosure.

Figure 5A:
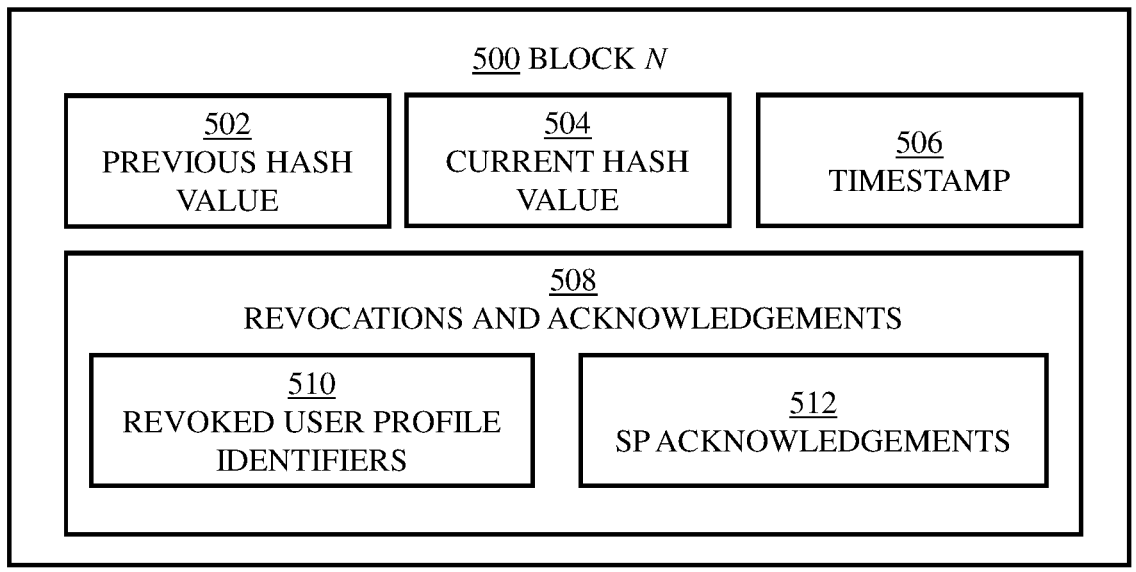
FIG. 5A illustrates a block diagram of an example ledger component, according to embodiments of the present disclosure.

FIG. 5A illustrates a block diagram of an example ledger data structure, in accordance with embodiments of the present disclosure. In embodiments where the ledger (e.g., ledger 106 of FIG. 1, ledger 206 of FIG. 2) is a blockchain, block N 500 can be a block in the blockchain other than the genesis block. Block N 500 can include a previous hash value 502, a current hash value 504, a timestamp 506, and one or more revocations and/or acknowledgments 508. The previous hash value 502 can be a hash of a previous block in the blockchain (e.g., block N−1), or a pointer to the header of the previous block in the blockchain.

The current hash value 504 can be a hash value of the data including the revocations and acknowledgments 508. Current hash value 504 is discussed in more detail with respect to FIG. 5B.

Timestamp 506 can include the date and time that block N 500 was first created, last updated, and/or last accessed. Revocations and acknowledgements 508 can indicate revoked user profile identifiers 510 and SP acknowledgements 512. In some embodiments, revoked user profile identifiers 510 are published to block N 500 by an IdP, whereas SP acknowledgements are published to block N 500 by a SP, where the IdP provides FIdM to the SP. Revoked user profile identifiers 510 can include a public, anonymous, or encrypted identifier of a user profile such as, but not limited to, an email address, username, account number, or phone number. SP acknowledgements 512 can include a SP identifier, a user profile identifier from revoked user profile identifiers 510, and a timestamp.

Figure 5B:
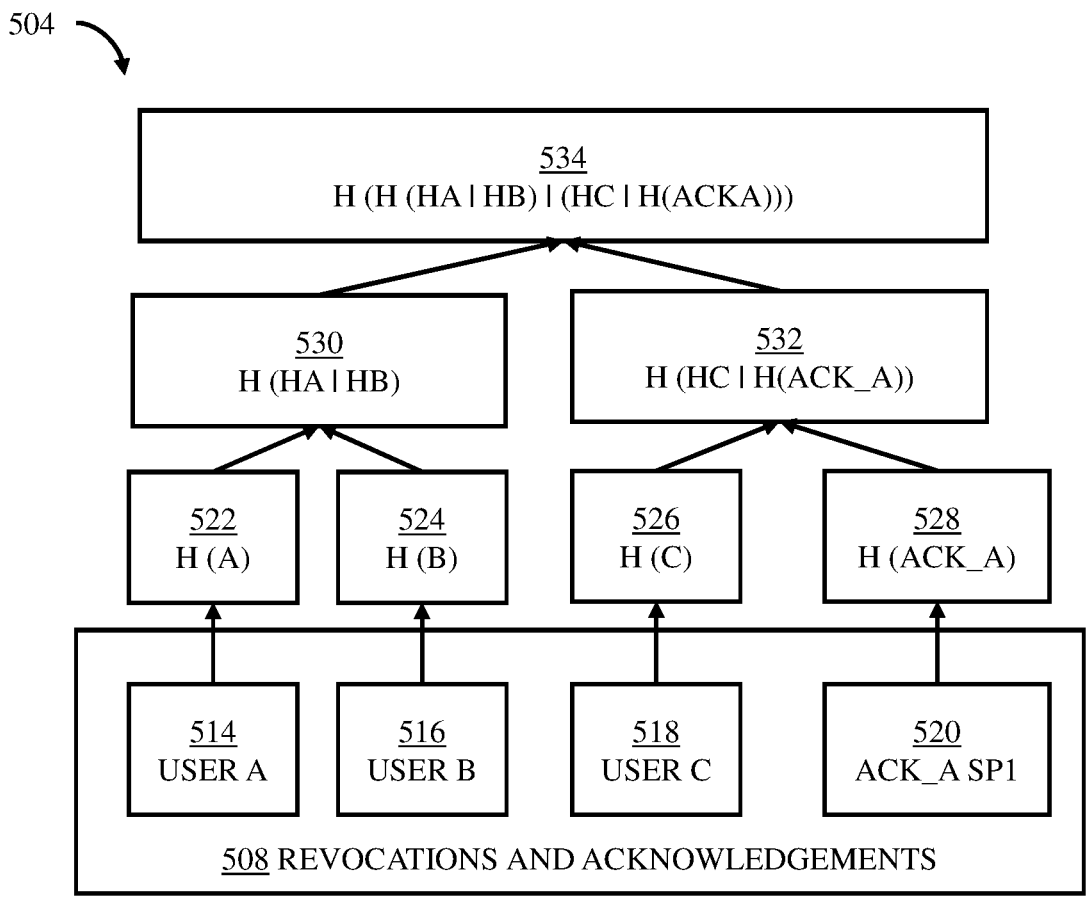
FIG. 5B illustrates a block diagram of an example hash value, according to embodiments of the present disclosure.

FIG. 5B illustrates an example current hash value 504, in accordance with embodiments of the present disclosure. Current hash value 504 can be based, at least in part, on revocations and acknowledgements 508. Each user profile A-C 514-518 can be associated with a fixed length identifier (e.g., account number, phone number, social security number, etc.) or a variable length identifier (e.g., username, email address, etc.). Acknowledgements, such as ack_A_SP1 520 can likewise be associated with fixed or variable length information such as, for example, a user profile identifier concatenated with a SP identifier. Although three user profiles and one acknowledgement are shown, it should be understood that tens, hundreds, or thousands of user profiles and/or acknowledgements are possible in alternative embodiments, having similar or dissimilar properties and structures than those shown in FIG. 5B.

Each user profile can be hashed to generate H(A) 522, H(B) 524, and H(C) 526. Likewise, ack_A_SP1 520 can be hashed to generated H(ACK_A) 528. Pairs of hashes can be combined (e.g., concatenated) into H(HA|HB) 530 and H(HC|H(ACK_A)) 532. Combined hashes can be combined until reaching a root hash 534. In the example illustrated in FIG. 5B, root hash 534 comprises the hash H(H(HA|HB) |H(HC|H(ACK_A))), however, root hash 534 can include more or fewer combinations of hash values than the hash value shown. Root hash 534 can be used, in whole or in part, to generate current hash 504 of FIG. 5A. In some embodiments, root hash 534 can be referred to as a Merkle root.

As used herein, hash values, hash functions, hashes, and hashing can refer to a function capable of mapping data of arbitrary size to data of fixed size by outputting a hash, hash value, hash code, or digest. Hashes can use a hash function (e.g., Jenkins hash, Zobrist hashing, etc.) in conjunction with a hash-table collision resolution scheme (e.g., coalesced hashing, cuckoo hashing, hopscotch hashing, etc.). In some embodiments, the hash value can be a fixed size such as, but not limited to 32 bits, 128 bits, 160 bits, 512 bits, or a different size. In some embodiments, the hash value can be based on a hashing function such as Secure Hash Algorithm 1 (SHA-1) that generates a 160 bit (20 byte) hexadecimal number that is 40 digits long, a MD5 message digest algorithm that produces a 128 bit hash value, a Bernstein hash, a Fowler-Noll-Vo hash value, a Jenkins hash value, a Pearson hash value, a Zobrist hash value, and so on.

The aforementioned components of FIGS. 5A and 5B are not limiting, and embodiments of the present disclosure exist that contain different and/or additional components than the components illustrated in FIGS. 5A and 5B while remaining within the spirit and scope of the present disclosure.

Figure 6:
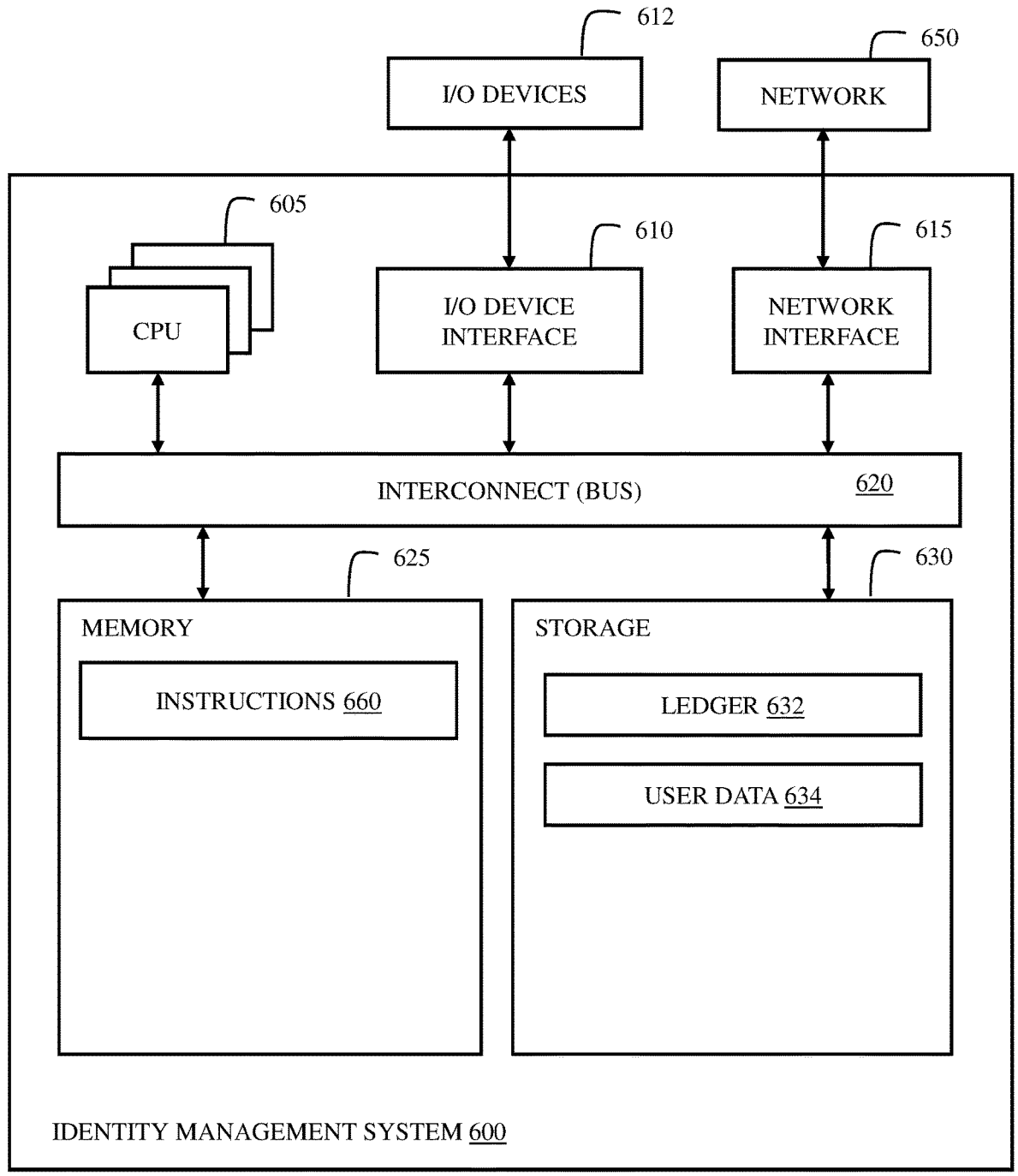
FIG. 6 illustrates a block diagram of an example identity management system, in accordance with embodiments of the present disclosure.

FIG. 6 illustrates a block diagram of an example identity management system 600 in accordance with some embodiments of the present disclosure. In various embodiments, identity management system 600 can perform the methods described in FIGS. 2-4. In some embodiments, identity management system 600 provides instructions for any of the methods described in FIGS. 2-4 to a client machine such that the client machine executes the method, or a portion of the method, based on the instructions provided by the identity management system 600. In some embodiments, identity management system 600 can execute functionality associated with an IdP (e.g., FIG. 3), a SP (e.g., FIG. 4), or both an IdP and a SP (e.g., FIG. 2).

The identity management system 600 includes a memory 625, storage 630, an interconnect (e.g., BUS) 620, one or more CPUs 605 (also referred to as processors 605 herein), an I/O device interface 610, I/O devices 612, and a network interface 615.

Each CPU 605 retrieves and executes programming instructions stored in the memory 625 or storage 630. The interconnect 620 is used to move data, such as programming instructions, between the CPUs 605, I/O device interface 610, storage 630, network interface 615, and memory 625. The interconnect 620 can be implemented using one or more busses. The CPUs 605 can be a single CPU, multiple CPUs, or a single CPU having multiple processing cores in various embodiments. In some embodiments, a CPU 605 can be a digital signal processor (DSP). In some embodiments, CPU 605 includes one or more 3D integrated circuits (3DICs) (e.g., 3D wafer-level packaging (3DWLP), 3D interposer based integration, 3D stacked ICs (3D-SICs), monolithic 3D ICs, 3D heterogeneous integration, 3D system in package (3DSiP), and/or package on package (PoP) CPU configurations). Memory 625 is generally included to be representative of a random access memory (e.g., static random access memory (SRAM), dynamic random access memory (DRAM), or Flash). The storage 630 is generally included to be representative of a non-volatile memory, such as a hard disk drive, solid state device (SSD), removable memory cards, optical storage, or flash memory devices. In an alternative embodiment, the storage 630 can be replaced by storage area-network (SAN) devices, the cloud, or other devices connected to the identity management system 600 via the I/O device interface 610 or a network 650 via the network interface 615.

In some embodiments, the memory 625 stores instructions 660 and the storage 630 stores ledger 632 and user data 634. However, in various embodiments, the instructions 660, ledger 632, and user data 634 are stored partially in memory 625 and partially in storage 630, or they are stored entirely in memory 625 or entirely in storage 630, or they are accessed over a network 650 via the network interface 615.

Instructions 660 can be processor-executable instructions for performing any portion of, or all of, any of the methods of FIGS. 2-4. Ledger 632 can store and publish account revocations from an IdP and revoked account acknowledgements from a SP. In some embodiments, ledger 632 is a public, private, or hybrid blockchain. Ledger 632 can be consistent with ledger 106 of FIG. 1 and/or ledger 206 of FIG. 2. User data 634 can correspond to user accounts stored by an IdP and/or derived user accounts stored by a SP. User data 634 can be consistent with user profiles 108 and/or derived user profiles 116 of FIG. 1.

In various embodiments, the I/O devices 612 include an interface capable of presenting information and receiving input. For example, I/O devices 612 can present information to a user interacting with identity management system 600 and receive input from the user.

Identity management system 600 is connected to the network 650 via the network interface 615. Network 650 can comprise a physical, wireless, cellular, or different network.

Embodiments of the present invention can be a system, a method, and/or a computer program product at any possible technical detail level of integration. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or subset of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While it is understood that the process software (e.g., any of the instructions stored in instructions 660 of FIG. 6 and/or any software configured to perform any subset of the methods described with respect to FIG. 3-4, or to implement the communication diagram of FIG. 2, in whole or in part) can be deployed by manually loading it directly in the client, server, and proxy computers via loading a storage medium such as a CD, DVD, etc., the process software can also be automatically or semi-automatically deployed into a computer system by sending the process software to a central server or a group of central servers. The process software is then downloaded into the client computers that will execute the process software. Alternatively, the process software is sent directly to the client system via e-mail. The process software is then either detached to a directory or loaded into a directory by executing a set of program instructions that detaches the process software into a directory. Another alternative is to send the process software directly to a directory on the client computer hard drive. When there are proxy servers, the process will select the proxy server code, determine on which computers to place the proxy servers' code, transmit the proxy server code, and then install the proxy server code on the proxy computer. The process software will be transmitted to the proxy server, and then it will be stored on the proxy server.

Embodiments of the present invention can also be delivered as part of a service engagement with a client corporation, nonprofit organization, government entity, internal organizational structure, or the like. These embodiments can include configuring a computer system to perform, and deploying software, hardware, and web services that implement, some or all of the methods described herein. These embodiments can also include analyzing the client's operations, creating recommendations responsive to the analysis, building systems that implement subsets of the recommendations, integrating the systems into existing processes and infrastructure, metering use of the systems, allocating expenses to users of the systems, and billing, invoicing (e.g., generating an invoice), or otherwise receiving payment for use of the systems.

What is claimed is:

1. A computer-implemented method comprising:
   creating, by an identity provider, a blockchain for publishing account revocation information to service providers using the identity provider for federated identity management;
   detecting, by the identity provider, a first revoked user account, wherein the first revoked user account includes a first account identifier;
   publishing, by the identity provider and in response to detecting the first revoked user account, a batch of revoked account identifiers including the first account identifier to the blockchain, wherein publishing the batch further comprises:
      receiving the batch of revoked account identifiers in a sequential order by revocation times;
      ordering the revoked account identifiers in a random order according to the revocation times; and
      publishing the batch of revoked account identifiers in the random order to the blockchain;
   retrieving, by the identity provider and in response to publishing the first account identifier to the blockchain, an acknowledgement from the blockchain, wherein the acknowledgement is created by a service provider using the identity provider for federated identity management; and
   deleting, by the identity provider and in response to retrieving the acknowledgement from the blockchain, the first revoked user account from the identity provider.

2. The method of claim 1, further comprising:
   suspending, by the identity provider and in response to detecting the first revoked user account, the first revoked user account.

3. The method according to claim 1, wherein publishing the revoked account identifiers to the blockchain occurs at a time period of excess processing capacity at the identity provider.

4. The method according to claim 1, wherein the first account identifier comprises an encrypted identifier.

5. The method according to claim 1, wherein the first account identifier comprises an email address.

6. A computer-implemented method comprising:
establishing a federated identity management between a service provider and an identity provider;
provisioning, by the service provider and in response to establishing the federated identity management with the identity provider, a first user account using information provided by the identity provider;
creating, by the identity provider, a blockchain for publishing account revocation information;
detecting, by the identity provider, a first revoked user account, wherein the first revoked user account is associated with a first account identifier;
publishing, by the identity provider, a batch of revoked account identifiers including the first account identifier to the blockchain, wherein publishing the batch further comprises:
receiving the batch of revoked account identifiers in a sequential order by revocation times; and
ordering the revoked account identifiers in a random order according to the revocation times; and
publishing the batch of revoked account identifiers in the random order to the blockchain;
retrieving, by the service provider, the first account identifier from the blockchain;
determining, by the service provider, that the first account identifier corresponds to the first user account;
deleting, by the service provider and in response to determining that the first account identifier corresponds to the first user account, the first user account from the service provider;
publishing, by the service provider and to the blockchain, a first acknowledgement indicating that the service provider deleted the first user account;
retrieving, by the identity provider, the first acknowledgement from the blockchain; and
deleting, by the identity provider and in response to retrieving the first acknowledgement from the blockchain, the first revoked user account from the identity provider.

7. The method according to claim 6, wherein the service provider retrieves revocation information from the blockchain in response to an authentication attempt by the first user account.

8. The method according to claim 6, further comprising:
suspending, by the identity provider and in response to detecting the first revoked user account, the first revoked user account.

9. The method of claim 6, wherein retrieving the first acknowledgement from the blockchain further comprises:
polling, by the identity provider and at respective time intervals, the blockchain for the first acknowledgement.

10. A computer-implemented method comprising:
creating a blockchain for publishing account revocation information to service providers using an identity provider for federated identity management;
receiving a batch of revoked account identifiers in a sequential order by revocation times, the batch including a first account identifier corresponding to a first revoked user account;
ordering the revoked account identifiers in a random order according to the revocation times;
publishing the batch of revoked account identifiers in the random order to the blockchain;
retrieving, in response to publishing the batch of revoked account identifiers in the random order to the blockchain, an acknowledgement related to the first account identifier from the blockchain; and
deleting, in response to retrieving the acknowledgement related to the first account identifier from the blockchain, the first revoked user account from the identity provider.

11. The method of claim 10, wherein publishing the batch of revoked account identifiers occurs at a time period of excess processing capacity at the identity provider.

12. The method of claim 10, wherein the first account identifier comprises an encrypted identifier.

13. The method according to claim 10, wherein the first account identifier comprises an email address.

14. The method of claim 10, wherein retrieving the acknowledgement from the blockchain further comprises:
polling, at respective time intervals, the blockchain for the first acknowledgement.

* * * * *